United States Patent [19]

Bennett

[11] Patent Number: 4,734,001
[45] Date of Patent: Mar. 29, 1988

[54] LOCKING FASTENER

[76] Inventor: Bruce A. Bennett, 15 Chestnut Ave., San Rafael, Calif. 94901

[21] Appl. No.: 888,011

[22] Filed: Jul. 18, 1986

Related U.S. Application Data

[63] Continuation-in-part of Ser. No. 755,907, Jul. 17, 1985, abandoned.

[51] Int. Cl.$^4$ .................................... F16B 39/10
[52] U.S. Cl. .................................... 411/119; 411/120; 411/124
[58] Field of Search .................. 411/90-100, 411/116-124, 353, 372, 517, 373, 429, 539

[56] References Cited

U.S. PATENT DOCUMENTS

| 274,188 | 3/1883 | Groves .................. 411/95 |
| 441,990 | 12/1900 | Telfer . |
| 758,503 | 9/1903 | Waters .................. 411/517 |
| 1,070,946 | 8/1913 | Davis . |
| 1,088,515 | 2/1914 | Bazin . |
| 1,154,813 | 9/1915 | Sellers . |
| 1,209,460 | 12/1916 | Lowe .................. 411/353 |
| 1,332,268 | 3/1920 | Mainka . |
| 1,358,496 | 11/1920 | Austin . |
| 1,470,294 | 10/1923 | Sell . |
| 2,406,286 | 8/1946 | Gantnier .................. 411/353 |
| 2,411,761 | 11/1946 | Stolberg .................. 411/517 |
| 2,741,290 | 4/1956 | Wolfe .................. 411/116 |
| 3,493,026 | 2/1970 | Donofrio et al. . |
| 3,498,655 | 3/1970 | Arms et al. .................. 411/116 X |
| 3,875,985 | 4/1975 | Okuda .................. 411/120 |
| 3,987,697 | 10/1976 | Wurzel .................. 411/353 |
| 4,267,870 | 5/1981 | Warner . |
| 4,274,460 | 6/1981 | Egner .................. 411/353 |
| 4,282,913 | 8/1981 | Trimmer . |
| 4,284,114 | 8/1981 | Korenobu . |
| 4,302,137 | 11/1981 | Hart .................. 411/432 |
| 4,329,097 | 5/1982 | Steele et al. .................. 411/93 X |
| 4,343,581 | 8/1982 | Millheiser .................. 411/517 |
| 4,370,083 | 1/1983 | Burnett et al. .................. 411/87 |
| 4,405,274 | 9/1983 | Saitoh et al. .................. 411/249 |

FOREIGN PATENT DOCUMENTS

| 104228 | 6/1938 | Australia .................. 411/116 |
| 517186 | 2/1953 | Belgium .................. 411/119 |
| 971597 | 2/1959 | Fed. Rep. of Germany ...... 411/119 |
| 1143364 | 2/1963 | Fed. Rep. of Germany ........ 411/90 |
| 2903706 | 8/1980 | Fed. Rep. of Germany . |
| Ad.15467 | 5/1912 | France .................. 411/124 |
| 583366 | 10/1924 | France .................. 411/90 |
| 637364 | 1/1928 | France .................. 411/116 |
| 408088 | 12/1944 | Italy .................. 411/539 |
| 468629 | 7/1937 | United Kingdom .................. 411/124 |
| 527340 | 10/1940 | United Kingdom .................. 411/427 |

Primary Examiner—Gary L. Smith
Assistant Examiner—Rodney M. Lindsey
Attorney, Agent, or Firm—Flehr, Hohbach, Test, Albritton & Herbert

[57] ABSTRACT

Locking fastener comprising a threaded part such as a bolt or nut and a locking plate which fits over the bolt or nut and is prevented from rotation by engagement with a stationary object such as a protrusion on the part to be secured. The locking plate has an opening with a contour which mates with the outer contour of the fastener to prevent rotation of the fastener, and the plate is retained on the fastener by a retainer mounted in a groove formed in the fastener itself. The retainer is free to rotate in the groove and is free from stress due to vibration, heat or cold.

15 Claims, 6 Drawing Figures

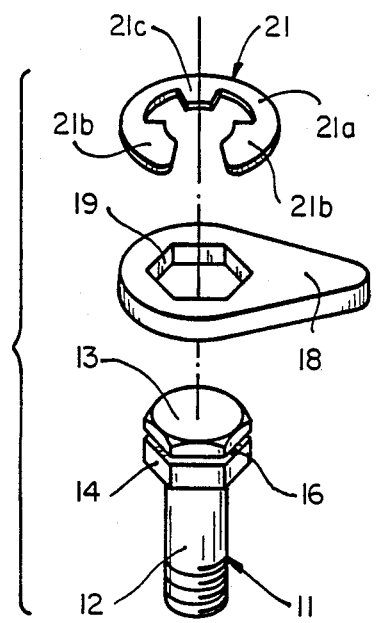
FIG_1
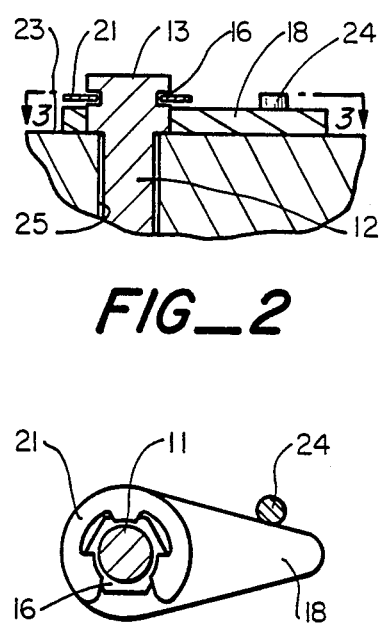
FIG_2
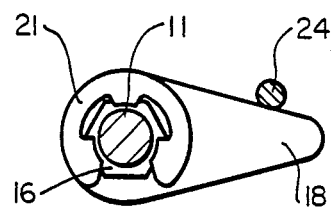
FIG_3
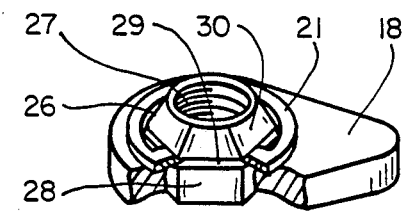
FIG_4
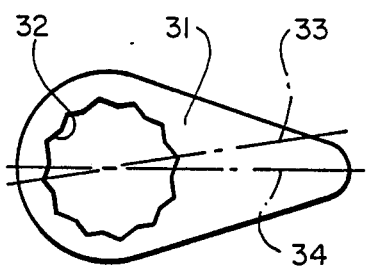
FIG_5
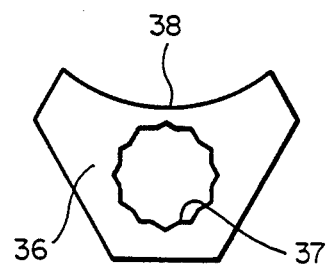
FIG_6

LOCKING FASTENER

This is a continuation-in-part of Ser. No. 755,907, filed July 17, 1985 now abandoned.

This invention pertains generally to threaded fasteners such as bolts and nuts, and more particularly to a fastener which is secured against movement from a set position.

Heretofore, a number of techniques have been employed to secure bolts and nuts and prevent them from working loose when subjected to vibration. Such techniques have included the use of lock washers, locking fluids, various mechanical restraints, and even welding the fasteners in place. All of these techniques have certain limitations and disadvantages. Some are too complicated for practical use, some are ineffective, and some can be employed only in certain specific applications. With many of these techniques, it is not possible to remove the fastener once it has been secured without destroying either the locking device or the fastener itself.

It is in general an object of the invention to provide a new and improved fastener which is secured against movement from a set position.

Another object of the invention is to provide a fastener of the above character which overcomes the limitations and disadvantages of locking fasteners heretofore provided.

Another object of the invention is to provide a fastener of the above character which is easily installed and removed, reliable and suitable for use in a wide variety of applications.

These and other objects are achieved in accordance with the invention by providing a threaded fastener such as a bolt or nut with a locking plate which fits over the fastener and is prevented from rotation by engagement with a stationary object such as a protrusion on the part to be secured. The plate has an opening with a contour which mates with the outer contour of the fastener to prevent rotation of the fastener, and the plate is retained on the fastener by a retainer mounted in a groove formed in the fastener itself. The retainer is free to rotate in the groove and is free from stress due to vibration, heat or cold.

FIG. 1 is an exploded isometric view of one embodiment of a locking fastener according to the invention.

FIG. 2 is a cross-sectional view of the fastener of FIG. 1 in its assembled and operative position.

FIG. 3 is a cross-sectional view taken along line 3—3 in FIG. 2.

FIG. 4 is an isometric view, partly broken away, of a second embodiment of a locking fastener according to the invention.

FIGS. 5 and 6 are top plan views of additional embodiments of locking plates for use in the fastener of the invention.

As illuatrated in FIG. 1, the locking fastener comprises a threaded fastener or part in the form of a bolt 11 which has a threaded shank portion 12 and a hexagonal head portion 13. The head portion has a non-circular contour in plan view, with flat surfaces 14 arranged in opposing pairs for engagement by a wrench. A peripheral groove 16 is formed in the head portion toward the outer end of the head portion and opens through the flat surfaces.

A locking plate 18 with a hexagonal opening 19 fits over the head portion of the bolt, with the head portion extending through the hexagonal opening. The size and shape of the opening are such that the head portion of the bolt can pass freely through the opening in an axial direction, but it cannot rotate within the opening. The plate has a generally teardrop shape and is adapted to abut against a stationary object such as a protrusion on the part to be held, thus preventing the bolt from rotating in the direction which would cause it to loosen.

The locking plate is retained axially on the bolt by an E-shaped retainer clip 21 mounted in groove 16. This clip. commonly known as an E-clip, has a generally C-shaped resilient body 21a, with ears 21b, 21c projecting inwardly from the end and central portions of the C-shaped body. The body has an outer diameter greater than the opening in locking plate 18, and the inwardly projecting ears are received in the groove 16 in the bolt head. The opening between the confronting ends of clip 21 is smaller than the diameter of groove 16, and the clip is mounted in the groove with a snapping action.

The inner or bottom wall of groove 16 is circular, and it is of slightly smaller diameter than E-clip 21 so that the E-clip is free to rotate on the bolt head. This isolates the E-clip from the direct effects of vibration, heating and cooling, and serves to prevent stress failures due to these factors.

In FIG. 2, the fastener is illustrated in connection with a workpiece 23 which has a protrusion 24 projecting therefrom. The bolt is inserted into a hole 25 in the workpiece and tightened in the conventional manner with a wrench which engages the head portion of the bolt. Thereafter, locking plate 18 is placed over the head portion of the bolt and positioned to abut against protrusion 24 in the event that the bolt should begin to loosen. Retainer clip 21 is inserted in groove 16, and the locking plate is thus retained between the workpiece and the retainer clip.

The thickness of locking plate 18 is less than the distance between groove 16 and the shoulder at the bottom of the bolt head so that it will not interfere with the rotation of the retainer clip in the groove. As noted above, this rotation is important in preventing stress failures due to vibration or changes in size or shape due to heating or cooling.

The embodiment of FIG. 4 is similar to the embodiment of FIG. 1, and like reference designate corresponding elements in the two embodiments. In the embodiment of FIG. 4, however, the fastener is a nut 26 having a hexagonal body with an internal thread 27 and external flat surfaces 28 arranged in opposite pairs for engagement with a wrench. Retainer clip 21 is mounted in a groove 29 which opens through surfaces 28 toward one end of the nut. Locking plate 18 fits over the nut and prevents rotation of the nut in the same manner that it prevents rotation of the bolt in the embodiment of FIG. 1. As in the embodiment of FIG. 1, the retainer clip is free to rotate in the groove.

The outer end surface 30 of the nut adjacent to groove 29 is bevelled or tapered to facilitate installation of the retainer clip. When pressed onto the nut over this surface, the clip opens and snaps into groove 29. This enables the retainer to be installed in an axial direction and permits the device to be employed in places where there is little or no access to the sides of the fastener. The head of a bolt or other fastener can be bevelled or tapered in a similar manner.

The locking plate 31 illustrated in FIG. 5 is similar to locking plate 18 except it has a 12-point opening 32 instead of a hexagonal opening. The opening is oriented to provide an offset of 7.5% between its axis of symmetry 33 and the centerline 34 of the plate. The plate can be positioned with either side up, and with the offset it can be oriented in any one of 24 different positions about the bolt or nut. The hexagonal opening 19 in plate 18 can be offset in a similar manner to provide 6 additional positions when that plate is turned over.

The locking plate can be of any suitable size and shape for a particular application, and FIG. 6 illustrates an embodiment which is particularly suitable for securing the nuts or bolts which hold an exhaust header on an engine. This plate, designated by the reference numeral 36, has a 12-point opening 37 and an arcuate side edge 38 which mates with the header pipe to prevent the plate from turning.

While the invention has been described with specific reference to bolts and nuts, it can be employed with lag screws and other threaded fasteners as well. The locking plate can be secured against rotation by abutting engagement with any nearby stationary object such as a protrusion on the part being held, another bolt or nut, or a dowel pin. The plate can also be secured by bending a portion of it over to form a tab for engagement with a stationary surface. The non-circular contour of the threaded fastener can be any contour which will interlock with a mating contour in the locking plate to prevent relative rotation of the two parts, including straight knurling or a spline and groove. Likewise, the retainer clip can be any suitable type of spring clip.

The invention has a number of important features and advantages. It is easily installed and removed, and it can be employed in both large and small spaces. It can be tightened with any type of wrench employed with conventional nuts and bolts in a similar space. No special tools are required to install and remove the locking plate and retainer clip. The clip can be installed either from the end of the bolt or nut or from the side. The clip and plate can be removed and reinstalled repeatedly without damage to either these parts or to the fastener itself, and without any loss of security. The condition of the parts can be observed visually, and the presence of the locking plate and retainer clip can be checked from a distance, e.g. on an overhead sign, or on a moving object, e.g. a conveyor. The parts are easily removed and tested if desired. The clip is free to rotate on the bolt or nut, and this prevents stress failures due to vibration, heating or cooling. The device is economical to manufacture, and it can employ a standard clip such as a standard E-clip as the retaining clip. No lockwasher is required, and there is no marring of the surface by such a washer. The threads can be lubricated or coated with an anti-seizing compound to facilitate installation and removal of the fastener without danger of permitting the fastener to work loose, and the fastener can be accurately tightened to a desired torque. This lock will not damage the threads of the fastener as do other locking devices such as nuts which misfit slightly or are swaged onto the fastener.

It is apparent from the foregoing that a new and improved locking fastener has been provided. While only certain presently preferred embodiments have been described in detail, as will be apparent to those familiar with the art, certain changes and modifications can be made without departing from the scope of the invention as defined by the following claims.

What is claimed is:

1. A fastener comprising a threaded part having an external surface of non-circular contour and a bearing surface, a locking plate having an opening in which the surface of non-circular contour is received to prevent rotation of the threaded part, a groove formed in the surface of non-circular contour and spaced from the bearing surface, and a retainer clip mounted in the groove to retain the locking plate on the threaded part, the bottom wall of the groove being of smaller dimension than the retainer clip and the locking plate having a thickness less than the distance between the bearing surface and the groove so that the clip is free to rotate within the groove.

2. The fastener of claim 1 wherein the threaded part is a bolt.

3. The fastener of claim 1 wherein the threaded part is a nut.

4. The fastener of claim 1 wherein the retainer clip comprises an E-clip.

5. The fastener of claim 1 wherein the threaded part has a tapered end surface adjacent to the groove, and the resilient retainer clip expands circumferentially and snaps into the groove when pushed onto the threaded part over the tapered surface.

6. A fastener comprising a bolt having a head portion with a peripheral surface and an axially facing shoulder, a locking plate which is constrained against rotation and has an opening in which the head portion of the bolt is received to prevent rotation of the bolt, an outwardly facing peripheral groove which opens through the peripheral surface and is spaced from the axially facing shoulder of the head portion, and a retainer clip removably mounted in the groove to retain the locking plate on the bolt, the groove having a smaller inner diameter than the clip and the locking part having a thickness less than the distance between the axially facing shoulder and the groove so that the clip is free to rotate within the groove.

7. The fastener of claim 6 wherein the retainer clip comprises an E-clip.

8. A fastener comprising a nut having a bearing surface at one end thereof, a peripheral surface engageable with a wrench and a peripheral groove spaced from the bearing surface and opening through the peripheral surface, a locking plate which is constrained against rotation and has an opening in which the nut is received to prevent rotation of the nut, and a retainer clip removably mounted in the groove to retain the locking plate on the nut, the groove having a smaller inner diameter than the clip and the locking plate having a thickness less than the distance between the bearing surface and the groove so that the clip is free to rotate within the groove.

9. The fastener of claim 8 wherein the retainer clip comprises an E-clip.

10. The fastener of claim 8 wherein the nut has a tapered end surface adjacent to the groove, and the resilient clip expands circumferentially and snaps into the groove when pushed onto the nut over the tapered surface.

11. In a fastener for use in an environment in which the fastener is subjected to elevated temperatures, motion and/or vibration: a threaded part having a peripheral surface of non-circular contour and a bearing surface, a locking part having an opening in which the surface of non-circular contour is received to prevent rotation of the threaded part, a groove having a circular bottom wall formed in the surface of non-circular contour spaced from and generally parallel to the bearing surface, and a resilient retaining clip removably mounted in the groove to retain the locking part on the threaded part, the bottom wall of the groove being of smaller diameter than the retaining clip and the locking part having a thickness less than the distance between the bearing surface and the groove so that the clip is free to rotate within the groove and is thereby isolated from direct transfer of heat, motion and vibration of the threaded part.

12. The fastener of claim 11 wherein the threaded part is a bolt.

13. The fastener of claim 11 wherein the threaded part is a nut.

14. The fastener of claim 11 wherein the retaining clip comprises an E-clip.

15. The fastener of claim 11 wherein the threaded part has a tapered end surface adjacent to the groove, and the resilient retaining clip expands circumferentially and snaps into the groove when pushed onto the threaded part over the tapered surface.

* * * * *